UNITED STATES PATENT OFFICE

2,656,364

PROCESS FOR THE MANUFACTURE OF 17-KETO STEROIDS

Emanuel B. Hershberg, West Orange, N. J., and Eugene P. Oliveto, Long Island City, N. Y., assignors to Schering Corporation, Bloomfield, N. J., a corporation of New Jersey No Drawing. Application July 16, 1951, Serial No. 237,079

23 Claims. (Cl. 260—397.3)

The present invention relates to the manufacture of 17-keto steroids, and more particularly to the degradation of 20-keto steroids to 17-keto steroids.

It is the general object of the present invention to convert steroids having at the 17-position a side chain which includes a carbonyl group at the 20-position, which carbonyl group may be a keto group in a multi-carbon side chain, or may form part of a 17-aldehydo group, in a simple manner into a compound having ketonic oxygen attached to the 17-carbon.

More specifically, it is an object of the present invention to convert $\Delta^{16}$ compounds of the type indicated into 17-keto steroids which are saturated in ring D.

It is known to degrade 17-steroid methyl ketones by reacting the 20-keto group with hydroxylamine and then to subject the resulting oxime to a Beckmann rearrangement. This rearrangement results in the formation of a 17-acetylamino steroid which is difficult to hydrolyze to the 17-keto compound. Such hydrolysis usually results in the intermediate formation of the 17-amino compound which, as described in the patent to Bockmühl, No. 2,212,363, is then reacted with sodium nitrite to produce the 17-hydroxy derivative, which thereupon is converted to the 17-keto compound by oxidation with chromic oxide in acetic acid solution. This procedure is cumbersome and time-consuming and, in addition, requires intermediate protection of the double bond by addition of bromine which must subsequently be removed, as by treatment with zinc in acetic acid. Aside from involving a long series of reactions, it is inevitable that the over-all yield of the final 17-keto compound is greatly reduced.

It has also been suggested to subject $\Delta^{16}$-20-oximo pregnenes to a Beckmann rearrangement with the aid of p-toluene sulfonyl chloride, followed by treatment with sulfuric acid to produce the 17-keto compound (Tendick, No. 2,335,616). This procedure, while it is stated to avoid the formation of the intermediate 17-acetylamido compound, nevertheless requires rigorous reaction conditions which unfavorably affect the yield of the final product.

Finally, it has been suggested (Julian, No. 2,531,411) to treat 20-oximo pregnane compounds which are saturated in the D ring with p-toluene sulfonyl chloride together with an acetyl acceptor, like ethanolamine, followed by treatment with sodium hydroxide, which results in the formation of the 17-amine substituted steroid.

We have found that when this last-mentioned reaction is applied to $\Delta^{16}$-steroids having an aliphatic group of one or more carbon atoms at the 17-position, and containing ketonic oxygen on the 20-carbon, there is obtained not the 17-amino compound described in the Julian patent, but rather a 17-keto compound. This result was entirely unexpected and makes it possible to degrade 20-carbonyl steroids into 17-ketones in a simple and inexpensive manner and with relatively high yields.

Our process may be represented by way of example by the following graphic formulae:

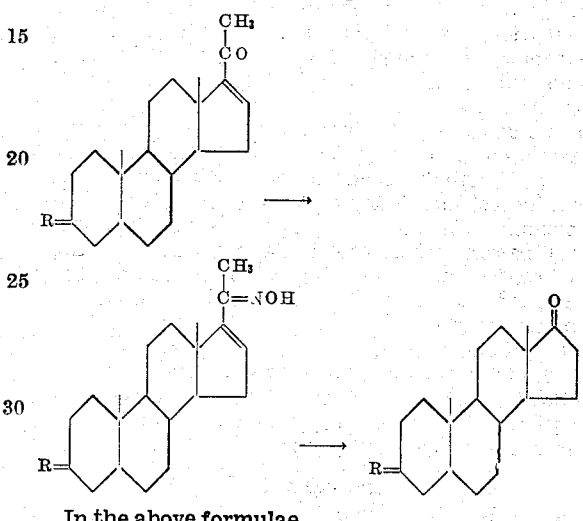

In the above formulae

R represents =O or $\diagup^{H}_{Y}$ wherein Y is hydroxyl, or groups convertible to hydroxyl with the aid of hydrolysis, such as ester groups (like acetoxy, benzoyloxy, etc.), ether groups (like methoxy, ethoxy and benzyloxy), chlorine, etc. The starting compounds include also steroids having a double bond attached to the 5-carbon, i. e. $\Delta^4$- and $\Delta^5$-steroids, and the nucleus may also be substituted at other positions, for example, at the 11- and 12-positions by a hydroxyl or substituted hydroxyl group, or by a carbonyl group at the 11-position.

While the above formulae show starting compounds having the carbon skeleton of the pregnane series, it is within the scope of the invention to employ steroids having only one or more than two carbon atoms in the group attached to the 17-carbon. Thus the starting compound may be a 17-aldehydo steroid, or it may have a 17-side chain in which a group is attached to the 20-carbonyl group which has two or more carbon atoms; and such latter group may be purely hydrocarbon in nature or contain substituents like hydroxyl, ester, ether and other groups, for example, of the types above specifically indicated.

In carrying out our invention, the $\Delta^{16}$-20-carbonyl steroid is first converted into its oxime in any suitable or convenient manner. The oxime is then reacted with a sulfonic acid, preferably in the form of its chloride, and the reaction mass is then heated to effect a rearrangement and splitting, resulting in the production of the 17-keto steroid. To facilitate the rearrangement and splitting, the reaction according to the invention takes place in the presence of a compound capable of binding an acyl group, that is, of a basically acting organic compound. These compounds include monohydric and polyhydric alcohols, including glycols (such as methanol, ethanol, ethylene glycol, glycerol, etc.) and primary and secondary aliphatic and cyclic amines, like butylamine, aniline, etc. The amines may be substituted by other groups like hydroxyl groups, as in the case of alkylolamines, such as ethanolamine and diethanolamine.

The sulfonic acid or its chloride are preferably aryl sulfonic acids or chlorides, such as benzene sulfonic acid chloride, p-toluene sulfonic acid chloride, etc.

It will be evident from the foregoing that in carrying out the processes of the present invention there are directly obtained 17-keto steroids without the necessity for employing a chromic acid oxidation, as described in the Bockmühl patent above referred to; nor is any protection of a nuclear double bond required as the intermediate is not subjected to an oxidation reaction. It will be seen further that our process eliminates the difficult step of hydrolyzing an acylamido steroid, as in the process of the Tendick patent; while the direct production of the 17-keto compound eliminates the additional reactions that would be required to convert the 17-amino group of the process of the Julian patent into ketonic oxygen.

The invention will be further described in the following examples which are presented for purposes of illustration only and not as indicating the scope of the invention:

*Example I*

A solution of 3 grams of $\Delta^{5,16}$-pregnadien-3($\beta$)-ol-20-one acetate oxime (16-dehydropregnenolone acetate oxime) in 10 cc. of pyridine was treated with 3 g. of p-toluene sulfonyl chloride, the addition being at such a rate as to keep the temperature below 40°. The mixture was allowed to stand in the ice-box overnight, then poured into ice and hydrochloric acid. The precipitated oximino-p-toluene sulfonate was isolated by filtration and dried. If desired, the product may be further purified by crystallization from aqueous acetone, but this is not necessary. The p-toluene sulfonate was added to 10 cc. of ethanolamine and the mixture warmed for 2 hours on the steam bath. 20 cc. of methanol and 5 cc. 30% sodium hydroxide was added and the mixture steam distilled until all the pyridine was removed. The crystallized product, dehydroepiandrosterone, was removed by filtration.

*Example II*

A solution of 3 g. $\Delta^{16}$-dehydropregnenolone acetate oxime in 10 cc. pyridine was treated with 3 g. of benzenesulfonyl chloride and subsequently treated as described in Example I. In an analogous fashion, there was obtained $\Delta^5$-androsten-3($\beta$)-ol-17-one (dehydroepiandrosterone).

*Example III*

A solution of 3 g. $\Delta^{16}$-dehydropregnenolone acetate oxime in 10 cc. pyridine was treated with 3 g. p-toluene sulfonyl chloride, the temperature of the mixture being kept below 5°. After standing for 3 hrs. at room temperature, the reaction mixture was treated with 30 cc. aniline and heated on the steam bath for 1 hour. There was then added 20 cc. methanol and 10 g. sodium hydroxide, and the mixture steam distilled until no more organic bases were distilled over. The crude dehydroepiandrosterone was removed by filtration.

*Example IV*

3 grams of the p-toluene sulfonate of 16-dehydropregnenolone acetate oxime was treated with 10 g. of ethylenediamine and heated on the steam bath for 3 hours. Methanol was added, and the solution steam distilled. The crystallized dehydroepiandrosterone, which was removed by filtration, could be purified by crystallization from aqueous methanol.

*Example V*

A solution of 4 g. $\Delta^{4,16}$-pregnadien-3,20-dione-20-monoxime (obtained by the Oppenauer oxidation of 16-dehydropregnenolone oxime) in 20 cc. pyridine was treated with 4 g. p-toluene sulfonyl chloride, and allowed to stand at room temperature for four hours. The excess pyridine was removed in vacuo, and the residue refluxed with 10 cc. benzene and 10 cc. n-butylamine for 3 hours. After steam distillation, $\Delta^4$-androsten-3,17-dione was collected by filtration.

We claim:

1. Process for the manufacture of 17-keto steroids, which comprises reacting a $\Delta^{16}$-20-oximo steroid with a member of the group consisting of sulfonic acids and sulfonic acid halides, and effecting a rearrangement of the resulting sulfonic acid ester of the oxime to a 17-keto steroid by heating the same in the presence of a basically acting organic compound.

2. Process for the manufacture of 17-keto steroids, which comprises reacting a $\Delta^{16}$-20-oximo steroid with a member of the group consisting of sulfonic acids and their chlorides, and effecting a rearrangement of the resulting sulfonic acid ester of the oxime to a 17-keto steroid by heating the same in the presence of an alcohol.

3. Process for the manufacture of 17-keto steroids, which comprises reacting a $\Delta^{16}$-20-oximo steroid with a member of the group consisting of sulfonic acids and their chlorides, and effecting a rearrangement of the resulting sulfonic acid ester of the oxime to a 17-keto steroid by heating the same in the presence of a member of the group consisting of primary and secondary amines.

4. Process according to claim 1 in which a $\Delta^{16}$-20-oximo pregnene is the starting compound.

5. Process according to a claim 4 wherein the pregnene compound is substituted in the 3-position by a group capable of conversion into hydroxyl with the aid of hydrolysis.

6. Process for the manufacture of 17-keto steroids, which comprises reacting a 3-acyl $\Delta^{16}$-20-oximo pregnene with a member of the group consisting of sulfonic acids and their chlorides, and effecting a rearrangement of the resulting sulfonic acid ester of the oxime to a 17-keto steroid by heating the same in the presence of a basically acting organic compound.

7. Process for the manufacture of $\Delta^5$-17-keto steroids which comprises reacting a $\Delta^{5,16}$-20-oximo steroid with a member of the group consisting of sulfonic acids and their chlorides, and effecting a rearrangement of the resulting sulfonic acid ester of the oxime to a 17-keto steroid by heating the same in the presence of a basically acting organic compound.

8. Process according to claim 1, wherein an aryl sulfonic acid compound is employed.

9. Process according to claim 1, wherein the sulfonic acid is p-toluene sulfonic acid.

10. Process for the manufacture of $\Delta^5$-17-keto steroids which comprises reacting a $\Delta^{5,16}$-20-oximo-pregnadiene with an aryl sulfonic acid, and effecting a rearrangement of the resulting sulfonic acid ester of the oxime to a 17-keto androstene by heating the same in the presence of a basically acting organic compound.

11. Process for the manufacture of 17-keto steroids having a double bond attached to the 5-carbon, which comprises reacting a $\Delta^{16}$-20-oximo steroid having a double bond attached also to the 5-carbon, with an aryl sulfonic acid, and effecting a rearrangement of the resulting sulfonic acid ester of the oxime to a 17-keto androstene by heating the same in the presence of a basically acting organic compound.

12. Process according to claim 1, wherein the sulfonic acid compound is a benzene sulfonyl chloride.

13. Process according to claim 1, wherein the sulfonic acid compound is benzene sulfonyl chloride.

14. Process according to claim 1, wherein the sulfonic acid compound is p-toluene sulfonyl chloride.

15. Process for the manufacture of 3,17-diketo steroids which comprises reacting a $\Delta^{16}$-3,20-pregnenedione-20-monoxime with a member of the group consisting of sulfonic acids and sulfonic acid halides, and effecting a rearrangement of the resulting sulfonic acid ester of the oxime to a 17-keto group by heating the same in the presence of a basically acting organic compound.

16. Process for the manufacture of dehydroepiandrosterone which comprises reacting an ester of $\Delta^{5,16}$-pregnadien-3($\beta$)-ol-20-one oxime with an aryl sulfonic acid chloride, and heating the formed oximino aryl sulfonate with an alkylolamine and with an organic base.

17. Process for the manufacture of dehydroepiandrosterone which comprises reacting $\Delta^{16}$-dehydropregnenolone acetate oxime with p-toluene sulfonyl chloride, and heating the product with aniline and with alcoholic alkali.

18. Process for the manufacture of dehydroepiandrosterone which comprises reacting $\Delta^{16}$-dehydropregnenolone acetate oxime with p-toluene sulfonyl chloride, and heating the product with ethylene-diamine.

19. Process for the manufacture of $\Delta^4$-androsten-3,17-dione, which comprises reacting $\Delta^{4,16}$-pregnadiene-3,20-dione-20-monoxime with an aryl sulfonyl halide and thereafter heating the product with a basically acting organic compound.

20. Process for the manufacture of $\Delta^4$-androsten-3,17-dione, which comprises reacting $\Delta^{4,16}$-pregnadiene-3,20-dione-20-monoxime with p-toluene sulfonyl chloride and then heating the product with a primary aliphatic amine to effect rearrangement to $\Delta^4$-androsten-3,17-dione.

21. Process according to claim 1 wherein the heating takes place at approximately steam bath temperature.

22. Process according to claim 2, wherein the heating takes place at approximately steam bath temperature.

23. Process according to claim 3, wherein the heating takes place at approximately steam bath temperature.

EMANUEL B. HERSHBERG.
EUGENE P. OLIVETO.

No references cited.